US012609764B2

(12) United States Patent
Yun

(10) Patent No.: US 12,609,764 B2
(45) Date of Patent: Apr. 21, 2026

(54) APPARATUS AND METHOD FOR ESTIMATING THE STATE OF CHARGE OF A SATELLITE BATTERY IN A SATELLITE SYSTEM

(71) Applicant: KOREA AEROSPACE RESEARCH INSTITUTE, Daejeon (KR)

(72) Inventor: Seok-Teak Yun, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 387 days.

(21) Appl. No.: 18/332,977

(22) Filed: Jun. 12, 2023

(65) Prior Publication Data

US 2023/0412259 A1 Dec. 21, 2023

(30) Foreign Application Priority Data

Jun. 16, 2022 (KR) ........................ 10-2022-0073759

(51) Int. Cl.
H04B 7/185 (2006.01)
H02J 7/00 (2006.01)

(52) U.S. Cl.
CPC ........ H04B 7/18543 (2013.01); H02J 7/0048 (2020.01)

(58) Field of Classification Search
CPC .......................... H04B 7/18453; H04J 7/0048
See application file for complete search history.

(56) References Cited

U.S. PATENT DOCUMENTS

2010/0121591 A1* 5/2010 Hall ..................... G01R 31/367
702/63
2021/0263164 A1* 8/2021 Gunning ................ G01S 19/07

2023/0003907 A1* 1/2023 Grayson ............... G01S 19/423
2023/0130388 A1* 4/2023 Reid ....................... G01S 19/02
342/357.44
2023/0408599 A1* 12/2023 Yun .................... G01R 31/3835

FOREIGN PATENT DOCUMENTS

KR 1020100131088 12/2010
KR 102433538 8/2022

OTHER PUBLICATIONS

Seok-Teak Yun et al., "Data-Driven In-Orbit Current and Voltage Prediction Using BI-LSTM for LEO Satellite Lithium-Ion Battery SOC Estimation", IEEE Transactions on Aerospace and Electronic Systems (vol. 58, Issue: 6, Dec. 2022), Date of Publication: Apr. 14, 2022, pp. 5292-5306, INSPEC Accession No. 22359995, DOI 10.1109/TAES.2022.3167624.

* cited by examiner

*Primary Examiner* — Abdelnabi O Musa
(74) *Attorney, Agent, or Firm* — Perman & Green, LLP

(57) ABSTRACT

The present disclosure relates to an apparatus and method for estimating a state of charge of a satellite battery in a satellite system. According to the present disclosure, a method of operating an apparatus for estimating a state of charge includes obtaining satellite information indicating the status of the satellite according to a mission plan of the satellite, generating prediction information about a battery state of the satellite in a non-contact duration of the satellite from the satellite information based on a pre-learned artificial neural network, obtaining measurement information about a battery state of the satellite in a contact duration of the satellite; and estimating the state of charge of the battery based on the prediction information and the measurement information.

9 Claims, 5 Drawing Sheets

FIG. 5

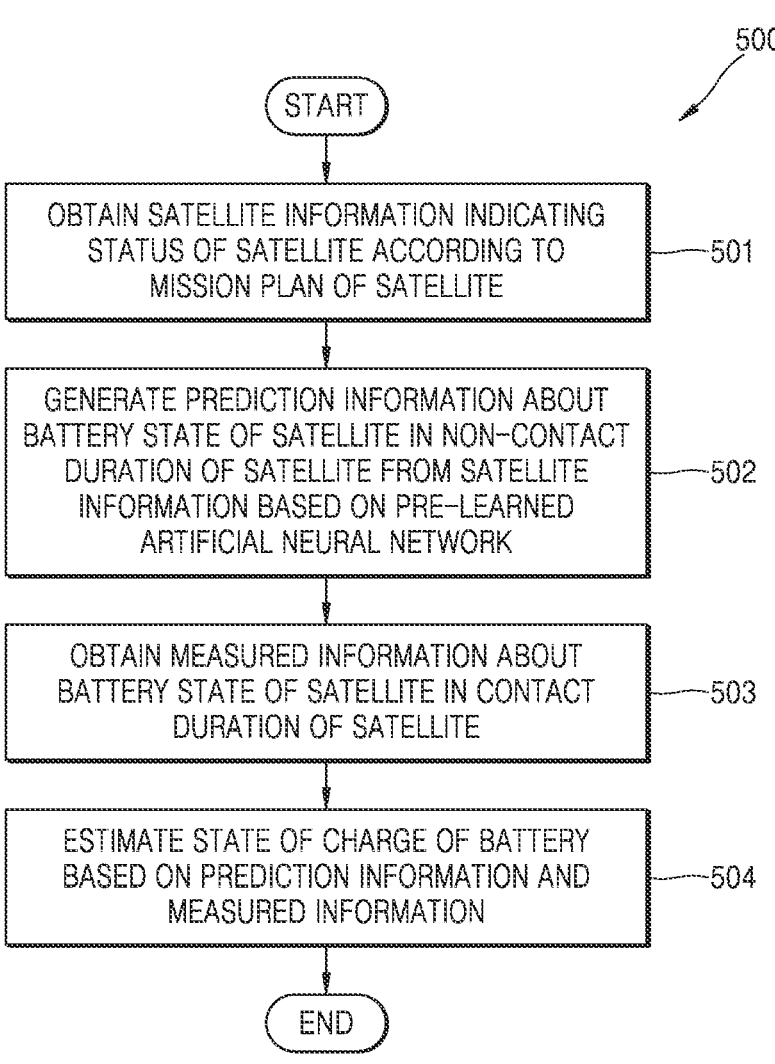

500

START

OBTAIN SATELLITE INFORMATION INDICATING STATUS OF SATELLITE ACCORDING TO MISSION PLAN OF SATELLITE ——501

GENERATE PREDICTION INFORMATION ABOUT BATTERY STATE OF SATELLITE IN NON-CONTACT DURATION OF SATELLITE FROM SATELLITE INFORMATION BASED ON PRE-LEARNED ARTIFICIAL NEURAL NETWORK ——502

OBTAIN MEASURED INFORMATION ABOUT BATTERY STATE OF SATELLITE IN CONTACT DURATION OF SATELLITE ——503

ESTIMATE STATE OF CHARGE OF BATTERY BASED ON PREDICTION INFORMATION AND MEASURED INFORMATION ——504

END

APPARATUS AND METHOD FOR ESTIMATING THE STATE OF CHARGE OF A SATELLITE BATTERY IN A SATELLITE SYSTEM

CROSS-REFERENCE TO RELATED APPLICATION

This application is based on and claims priority under 35 U.S.C. § 119 to Korean Patent Application No. 10-2022-0073759, filed on Jun. 16, 2022, in the Korean Intellectual Property Office, the disclosure of which is incorporated by reference herein in its entirety.

BACKGROUND

1. Field

The present disclosure generally relates to an apparatus and method for estimating the state of charge (SOC) of a battery in a satellite system, and more specifically, to an apparatus and method for determining the SOC of a battery by estimating the state of the battery of a satellite during a non-contact duration of the satellite by using an artificial neural network.

2. Description of the Related Art

A satellite system is a space system that uses one or more artificial satellites orbiting the earth. According to a satellite system, a ground station and a satellite may communicate with each other and the satellite may perform various missions. Specifically, a ground station located on earth may transmit a command signal to a transponder receiver of a satellite to control the satellite, and the satellite is driven according to the command signal to perform various types of missions such as the observations of weather, ocean, global environment, space environment, etc. and may transmit mission data to the ground station. A current satellite system operates a satellite, such as next-generation medium-sized satellite, multi-purpose practical satellite, and geostationary orbit complex satellite, for various purposes.

A satellite may include a satellite body and a battery. In an environment in which the sun shines on the satellite, the battery receives power from a solar panel and is charged with extra power. Electricity charged in the battery is used to operate the satellite when the sun is not shining on the satellite or in the case of seasonal lack of solar energy. Accordingly, a lifespan of a satellite to perform its mission depends on a lifespan of a battery, and the battery of the satellite is one of the very important parts in a satellite operation.

In order to perform a satellite mission, an operator must plan the satellite mission in consideration of the battery state of the satellite. An orbit period of a satellite may be divided into a contact duration in which communication with the ground station is possible and data in the orbit may be transmitted to the ground station and a non-contact duration with no communication. In a contact duration of a satellite, because the battery state of the satellite is transmitted to the operator of the ground station in real time, the operator may control the satellite using a received battery state. However, in a non-contact duration, the battery state of the satellite is not transmitted to the operator. Accordingly, it is difficult to consider the battery state in designing the mission of the satellite in the non-contact duration. In response to this issue, recently, a technique for predicting a battery state of a satellite in a non-contact duration has been developed.

The foregoing technology is technical information that the inventor possessed for derivation of the present invention or acquired during the derivation process of the present invention and does not necessarily indicate a known technology disclosed to the public prior to filing the present invention.

SUMMARY

Provided are an apparatus and method for estimating a state of charge (SOC) of a battery of a satellite in a satellite system based on the above matter.

In addition, provided are an apparatus and method for predicting a battery state of a satellite in a non-contact duration of the satellite by using an artificial neural network in a satellite system.

In addition, provided are an apparatus and method for determining an SOC of a battery based on measurement information about a battery state in a contact duration and prediction information about the battery state in a non-contact duration.

Additional aspects will be set forth in part in the description which follows and, in part, will be apparent from the description, or may be learned by practice of the presented embodiments of the disclosure.

According to an aspect of an embodiment, an operating method of an apparatus for estimating an SOC of a satellite battery in a satellite system, the operating method includes obtaining satellite information indicating a status of a satellite according to a mission plan of the satellite, generating prediction information about a battery state of the satellite in a non-contact duration of the satellite from the satellite information based on a pre-learned artificial neural network, obtaining measurement information about a battery state of the satellite in a contact duration of the satellite, and estimating the SOC of the satellite battery based on the prediction information and the measurement information.

According to another embodiment, the generating of the prediction information may include determining a prediction current of the battery in a non-contact duration of the satellite from the satellite information based on a pre-learned first artificial neural network and determining a prediction voltage of the battery in the non-contact duration from the satellite information and the prediction current based on a pre-learned second artificial neural network.

According to another embodiment, the first artificial neural network may include a neural network pre-learned to receive training satellite information and to output a training prediction current based on a degree of relationship between a satellite deployment state according to the training satellite information and a current of the battery according to the deployment state.

According to another embodiment, the second artificial neural network may include a neural network pre-learned to receive the training satellite information and the training prediction current, and to output a training prediction voltage based on a degree of relationship between the satellite deployment state according to the satellite information, the training prediction current, and the battery voltage.

According to another embodiment, the estimating of the SOC of the battery may include determining the SOC of the battery using at least one of a Kalman filter, an extended Kalman filter (EKF), and an unscented Kalman filter (UKF).

According to another embodiment, the satellite information may include at least one of a satellite attitude angle, a satellite position, a satellite attitude mode, an eclipse state of the satellite, a current time, and days after launch.

According to another embodiment, the first artificial neural network and the second artificial neural network may be each configured based on a bi-directional long short-term memory (BI-LSTM) network structure.

According to an aspect of an embodiment, an apparatus for estimating an SOC of a satellite battery in a satellite system, the apparatus includes a processor, wherein the processor is configured to acquire satellite information indicating a status of the satellite according to a mission plan of a satellite, generate prediction information about a battery state of the satellite in a non-contact duration of the satellite from the satellite information based on a pre-learned artificial neural network, obtain measurement information about the battery state of the satellite in a contact duration of the satellite; and estimate the SOC of the satellite battery based on the prediction information and the measurement information.

According to another embodiment, the processor may further be configured to determine a prediction current of the battery from the satellite information in the non-contact duration based on the pre-learned first artificial neural network; and determine the prediction voltage of the battery in the non-contact duration from the satellite information and the prediction current based on the pre-learned second artificial neural network.

According to another embodiment, the first artificial neural network may include a neural network pre-learned to receive training satellite information and output a training prediction current based on a degree of relationship between a satellite deployment state according to the training satellite information and a current of the battery according to the deployment state, and the second artificial neural network may include a neural network pre-learned to receive training satellite information and the training prediction current and output a training prediction voltage based on a degree of relationship between the satellite deployment state according to the satellite information, the training prediction current, and the battery voltage.

According to another embodiment, the processor may further be configured to determine the SOC of the battery using at least one of a Kalman filter, an EKF, and an UKF.

Each of the various aspects and features of the disclosure are defined in the appended claims. Combinations of features of the dependent claims may be combined with features of the independent claims as appropriate, not just those explicitly set forth in the claims.

In addition, one or more selected features of any embodiment described in the disclosure may be combined with one or more selected features of any other embodiment described in this disclosure, and alternative combinations of these features are possible, provided that the alternative combinations of these features at least partially alleviate one or more of the technical problems discussed in this disclosure, at least partially alleviate the technical problems discernable by those skilled in the art from this disclosure, or furthermore, unless a particular combination or permutation so formed of embodiment features is understood by those skilled in the art to be incompatible with the present disclosure.

In any described example implementation, two or more physically separate components may alternatively be integrated into a single component if such integration is possible, and if the single component so formed performs the same function, the integration is possible. Conversely, a single component in an arbitrary embodiment described in this disclosure may alternatively be implemented as two or more separate components that achieve the same function, where appropriate.

An object of certain embodiments of the present disclosure is to address, mitigate, or eliminate, at least in part, at least one of the problems and/or disadvantages associated with the prior art. Certain embodiments aim to provide at least one of the advantages described below.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a flowchart illustrating an operating method of an apparatus for estimating a charge state of a battery in a satellite system, according to various embodiments of the present disclosure.

DETAILED DESCRIPTION

Figure 1:
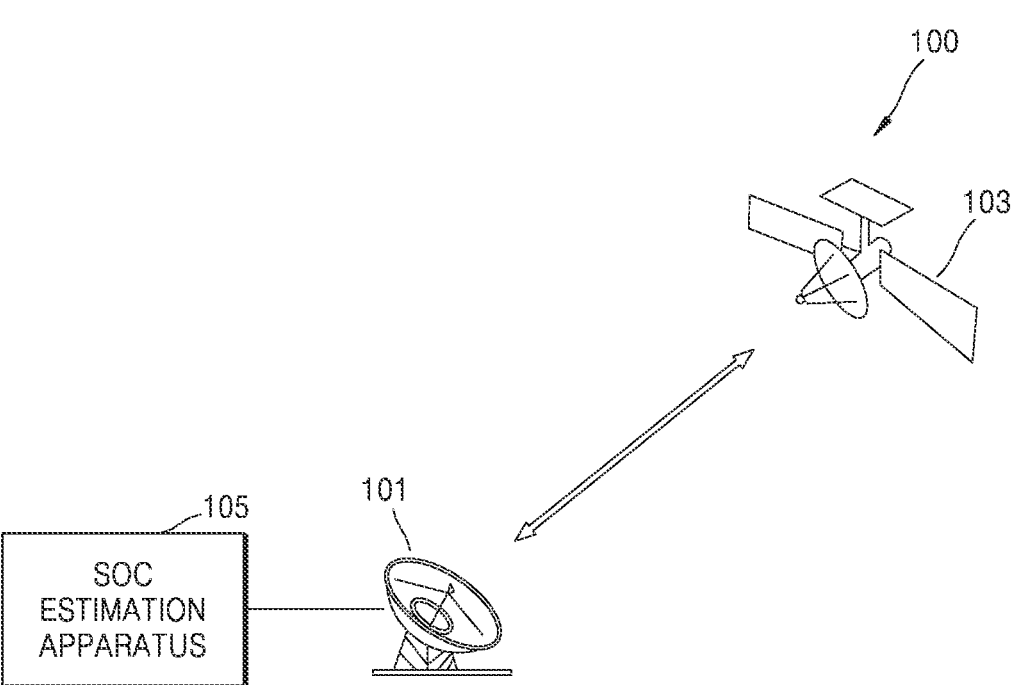
FIG. 1 illustrates a satellite system for estimating a charge state of a battery of a satellite, according to various embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used in the present disclosure are only used to describe a specific embodiment and may not be intended to limit the scope of other embodiments. Singular forms are intended to include the plural forms as well, unless the context clearly indicates otherwise Terms used herein, including technical or scientific terms, may have the same meaning as commonly understood by those of ordinary skill in the art described in this disclosure. Among the terms used in the present disclosure, terms defined in general dictionaries may be interpreted as having the same or similar meanings as those in the context of the related art, and unless explicitly defined in the present disclosure, it is not to be interpreted as an ideal or overly formal sense. In some cases, even terms defined in the present disclosure may not be interpreted to exclude embodiments of the present disclosure.

In various embodiments of the present disclosure described below, a hardware access method is described as an example. However, because various embodiments of the present disclosure include technology using both hardware and software, various embodiments of the present disclosure do not exclude software-based access methods.

Hereinafter, the present disclosure relates to an apparatus and method for estimating an SOC of a battery in a satellite system. Specifically, the present disclosure describes a technique for determining an SOC of a battery by predicting a battery state of a satellite in non-contact duration of the satellite using an artificial neural network.

Hereinafter, various embodiments will be described in detail so that those skilled in the art may easily implement the present disclosure with reference to the accompanying drawings. However, because the technical spirit of the present disclosure may be implemented in various forms, it is not limited to the embodiments described herein. In describing the embodiments disclosed in the specification, if it is determined that a detailed description of a related known technology may obscure the gist of the technical idea of the present disclosure, the detailed description of the known technology will be omitted. The same or similar components are assigned the same reference numerals, and duplicate descriptions thereof will be omitted.

In the specification, when an element is described as being "connected" to another element, this includes not only the case of being "directly connected" but also the case of being "indirectly connected" with another element intervening therebetween. When a part "comprises" or "includes" an element in the specification, unless otherwise defined, it is not excluding other elements but may further include other elements.

Some embodiments may be described as functional block structures and various processing steps. Some or all of these functional blocks may be implemented with any number of hardware and/or software components that perform a particular function. For example, functional blocks of the present disclosure may be implemented by one or more microprocessors or circuit configurations for a predetermined function. The functional blocks of the disclosure may be implemented in a variety of programming or scripting languages. The functional blocks of the disclosure may be implemented as an algorithm executing on one or more processors. The functions performed by the function blocks of the present disclosure may be performed by a plurality of function blocks, or the functions performed by the plurality of function blocks in the present disclosure may be performed by one function block. In addition, the present disclosure may employ prior art for electronic environment setting, signal processing, and/or data processing.

In addition, in the present disclosure, the expression of more than or less than is used to determine whether a specific condition is satisfied or fulfilled, but this is only a description for expressing an example and does not exclude above or below description. Conditions described as 'above' may be replaced with 'exceeds', conditions described as 'below' may be replaced with 'less', and conditions described as 'above and below' may be replaced with exceed and less.

FIG. 1 illustrates a satellite system 100 for estimating an SOC of a battery of a satellite according to various embodiments of the present disclosure.

Referring to FIG. 1, the satellite system 100 indicates a system in which a ground station 101 and a satellite 103 perform satellite missions through mutual communication. The ground station 101 and the satellite 103 may mutually transmit and receive signals for performing satellite missions through wireless communication and may perform satellite-related missions. Here, an SOC estimation apparatus 105 is a device for checking the SOC of the battery of the satellite 103 and may be connected to the ground station 101 by wire or wirelessly to assist in performing satellite missions. According to an embodiment of the present disclosure, the satellite system 100 includes the ground station 101, the satellite 103, and the SOC estimation apparatus 105.

The ground station 101 is located on the ground to control the satellite 103 and instructs devices that integrally perform missions using the satellites. The ground station 101 may transmit a command signal related to a satellite mission to the satellite 103 using a transmitter such as a radar. The ground station 101 may control driving of the satellite 103 using a command signal. In addition, the ground station 101 may receive a signal related to the performance of mission and the status of the satellite from the satellite 103 using a receiver.

The satellite 103 indicates an object orbiting around a celestial body such as a planet. The satellites 103 may include natural satellites that naturally orbit around celestial bodies and artificial satellites that are artificially made to orbit around planets. Hereinafter, the satellite 103 refers to an artificial satellite. According to one embodiment of the present disclosure, the satellite 103 may be configured as a computing device. The satellite 103 may receive at least one of a mission command signal for instructing mission performance and a control command signal for controlling driving of the satellite from the ground station 101. According to an embodiment of the present disclosure, when the satellite 103 receives a mission command signal related to a task of taking satellite photos for observing the earth and space, the satellite 103 may perform a task of taking satellite photos. According to another embodiment of the present disclosure, the satellite 103 may be controlled according to a control command signal when the satellite 103 receives a control command signal such as controlling the operation of the satellite 103 and reporting the status of the satellite 103. Thereafter, the satellite 103 may transmit a response signal corresponding to the command signal to the ground station 101.

The SOC estimation apparatus 105 refers to an apparatus for determining the state-of-charge of a battery of the satellite 103. The SOC estimation apparatus 105 may obtain satellite information indicating the status of the satellite according to a mission plan of the satellite from the ground station 101 and obtain measurement information about the battery state of the satellite from the satellite through the ground station 101. The SOC estimation apparatus 105 may calculate the SOC of the battery using satellite information about the mission plan and measurement information measured by the satellite 103. A specific method of estimating the aging of the battery by the SOC estimation device 105 will be described in detail below.

Figure 2:
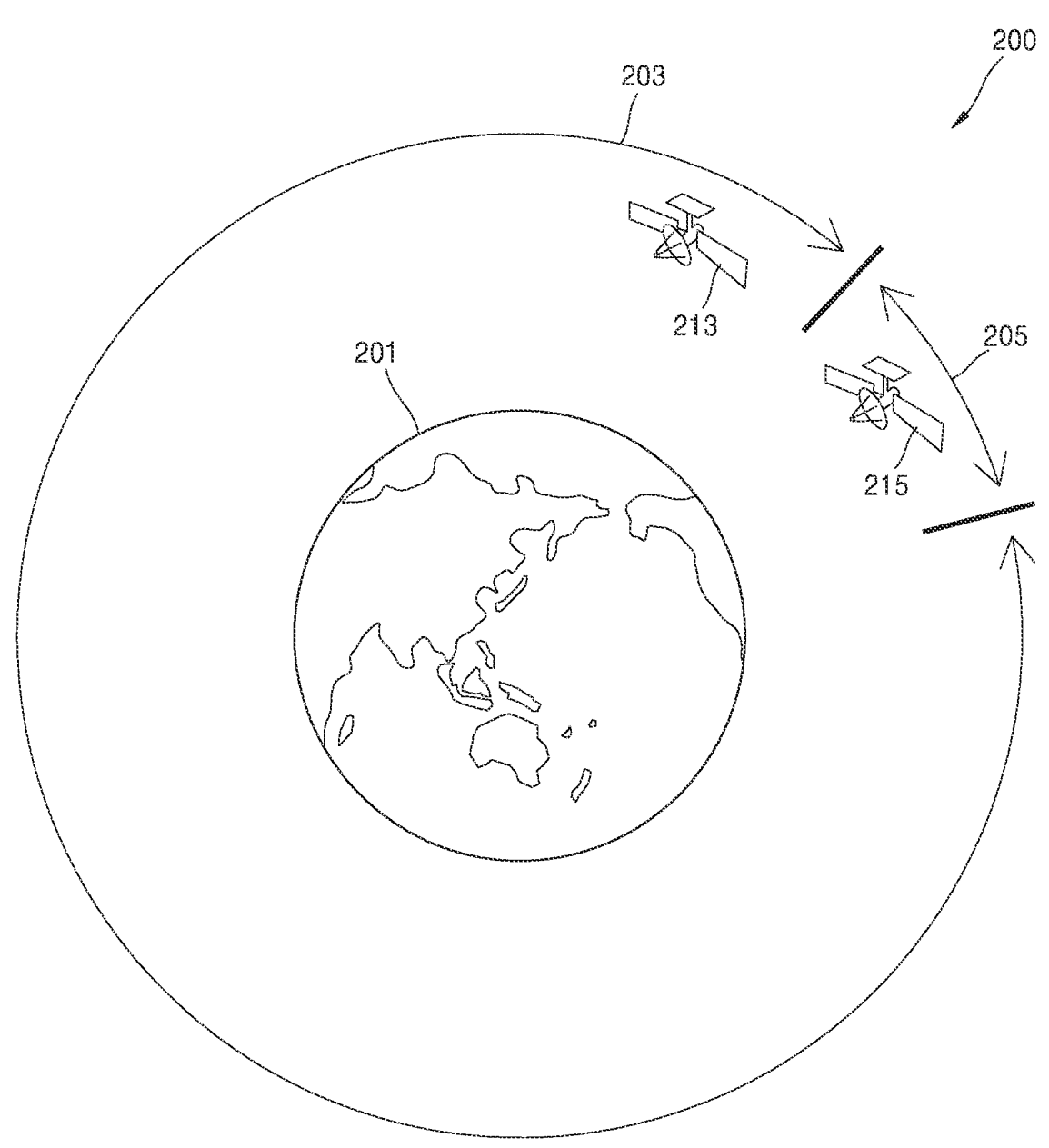
FIG. 2 illustrates an example of a satellite orbit period in a non-contact duration and a contact duration of a satellite system, according to various embodiments of the present disclosure.

FIG. 2 illustrates an example of a satellite orbit period 200 for a non-contact duration and a contact duration in the satellite system 100 according to various embodiments of the present disclosure. FIG. 2 illustrates a case in which the satellite 103 revolves around the earth 201.

Ground stations are not deployed on all surfaces of the earth 201. When the satellite 103 is farther away than a certain distance from the ground station, the satellite 103 may not perform communication with the ground station, but when the satellite 103 orbits near the ground station, the satellite 103 may send and receive signals with the ground station. Accordingly, an orbit period of the satellite 103 may be divided into a non-contact duration 203 in which there is no communication with the ground station and a contact duration 205 in which communication with the ground station is possible and data may be transmitted and received. Referring to FIG. 2, that is, the satellite 103 may not perform communication with the ground station deployed on the earth 201 in the non-contact duration 203 passing through the first location 213, and in the contact duration 205 passing through the second location 215, it is possible to perform communication with a ground station deployed on the earth. In addition, in the case of most satellites, the non-contact duration 203 has a longer time than the contact duration 205.

The operator sets up a mission plan considering the battery state of the satellite 103. Here, the satellite 103 may transmit the state of the battery to the ground station in real time while passing through the contact duration 205. However, the satellite 103 may not transmit the state of the battery to the ground station while passing through the non-contact duration 203. Therefore, to accurately determine the battery state of the satellite, it is necessary to estimate the battery state in the non-contact duration.

According to a method of estimating the SOC of a battery of a satellite based on on-board data, in the non-contact duration, in the case when the battery state of the satellite is estimated based on the power budget without data transmitted to the ground in real time, because the estimation of the battery state of the satellite is made by assuming the temperature and deterioration of the battery, the state of the battery of the satellite is not precisely measured.

However, the SOC estimation apparatus 105 according to the present disclosure may accurately estimate the battery state by estimating a current and voltage of the battery in the non-contact duration using a data-based learning model. Specifically, the SOC estimation apparatus 105 may use a data-based learning model learned by setting at least one of an angle of the satellite, the position of the satellite, the operation mode of the satellite, the eclipse state of the satellite, the current time, and the time after the start of the satellite as input data and by setting a current and voltage of the satellite battery as output data. The SOC estimation apparatus 105 may continuously estimate the battery state by using prediction information for the non-contact duration and measurement information transmitted in real time for the contact duration. The SOC estimation apparatus 105 may predict the battery state in the entire orbit including the non-contact duration by artificially synthesizing prediction data.

Figure 3:
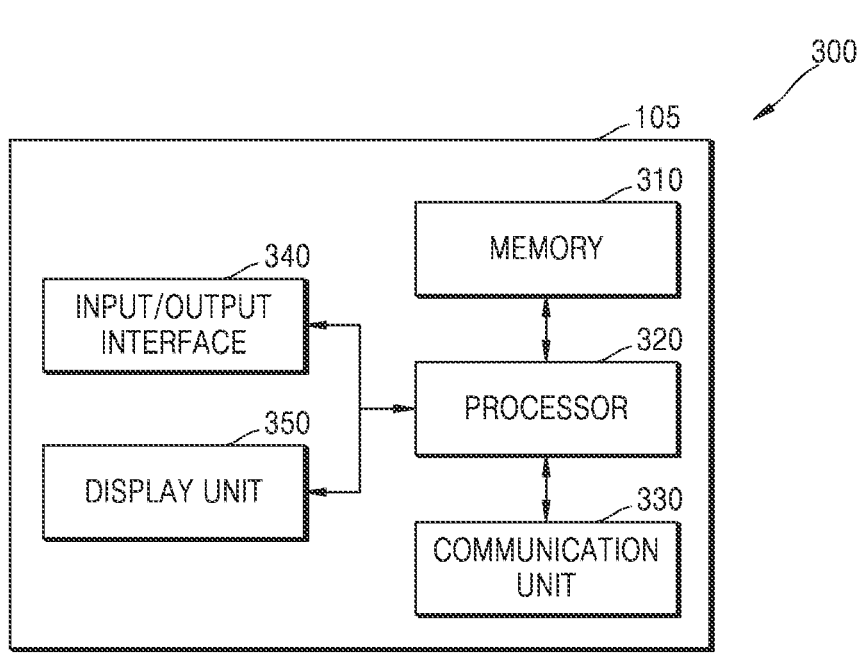
FIG. 3 illustrates a configuration of an apparatus for estimating a charge state of a battery in a satellite system, according to various embodiments of the present disclosure.

FIG. 3 illustrates a configuration 300 of the SOC estimation apparatus 105 in the satellite system 100 according to various embodiments of the present disclosure.

The term such as ' . . . unit' or ' . . . group' denotes units or modules that process at least one function or operation, and may be realized by hardware, software, or a combination of hardware and software. The SOC estimation apparatus 105 may include a memory 310, a processor 320, a communication unit 330, an input/output interface 340, and a display unit 350.

The memory 310 may temporarily or permanently store data such as a basic program for operation of the SOC estimation apparatus 105, an application program, and setting information. The memory 310 may include a permanent mass storage device such as random access memory (RAM), read only memory (ROM), and a disk drive, but the present disclosure is not limited thereto. These software components may be loaded from a recording medium readable by a separate computer from the memory 310 using a drive mechanism. The separate computer-readable recording medium may include a computer-readable recording medium such as a floppy drive, a disk, a tape, a DVD/CD-ROM drive, and a memory card. According to an embodiment, the software components may be loaded into the memory 310 through the communication unit 330 rather than a computer-readable recording medium. Also, the memory 310 may provide stored data according to a request of the processor 320. According to an embodiment of the present disclosure, the memory 310 may store satellite information indicating the status of a satellite according to a satellite mission plan, prediction information about the battery state of a satellite in a non-contact duration, and the like.

The processor 320 controls overall operations of the SOC estimation apparatus 105. For example, the processor 320 may control signals to be transmitted and received through the communication unit 330. In addition, the processor 320 may be configured to process commands of a computer program by performing basic arithmetic, logic, and input/output operations. Instructions may be provided to the processor 320 by the memory 310 or the communication unit 330. For example, processor 320 may be configured to execute instructions received according to program codes stored in a recording apparatus such as memory 310. For example, the processor 320 may control the SOC estimation apparatus 105 to perform operations according to various embodiments described later. According to an embodiment of the present disclosure, the processor 320 may obtain satellite information indicating the status of the satellite according to the mission plan of the satellite, based on a pre-learned artificial neural network, generate prediction information about the battery state of the satellite from the satellite information in a non-contact duration of the satellite, obtain measurement information about the state of the battery of the satellite in a contact duration of the satellite, and estimate the SOC of the battery based on the prediction information and the measurement information.

The communication unit 330 may perform functions for transmitting and receiving signals through a wireless channel. All or part of the communication unit 330 may be referred to as a transmission unit, a reception unit, or a transmission/reception unit. The communication unit 330 may provide a function for the SOC estimation apparatus 105 and at least one other node to communicate with each other through a communication network. According to an embodiment of the present disclosure, when the processor 320 of the SOC estimation apparatus 105 generates a request signal according to a program code stored in a recording device such as the memory 310, the request signal may be transmitted to at least one other node through a communication network according to the control of the communication unit 330. Conversely, a control signal, command, content, file, etc. provided under the control of a processor of the at least one other node may be received by the SOC estimation apparatus 105 through the communication unit 330. According to an embodiment of the present disclosure, the communication unit 330 may receive satellite information and measurement information. Also, the communication unit 330 may transmit an estimation result to the ground station 101 or an external device.

The input/output interface 340 may be a method for interface with an input/output device. At this time, the input device may be a device such as a keyboard or a mouse, and the output device may be provided in the form of a device such as a display unit for displaying an image. As another example, the input/output interface 340 may be a method for interface with a device in which functions for input and output are integrated into one, such as a touch screen. Specifically, in processing a command of the computer program loaded on the memory 310 by the processor 320 of the SOC estimation apparatus 105, a service screen or content generated by using data provided by the server may be displayed on a display through the input/output interface 340. According to one embodiment of the present disclosure, the input/output interface 340 may include a method for interface with the display unit 350. The input/output interface 340 may receive a user input for a web browsing window displayed on the display unit 350, and in response to the user input described above, and may receive output data to be output through the display unit 350 from the processor 320. According to an embodiment of the present disclosure, the input/output interface 340 may directly receive information for estimating the SOC or information about a command for estimating the SOC from the user.

The display unit 350 indicates a display module including one or more displays. Each of the one or more displays included in the display unit 350 may individually display independent content, or display a single content by combining the one or more displays described above. According to an embodiment of the present disclosure, it may be noted that one or more displays included in the display unit 350 may include multiple displays that are physically separated, multiple displays that are physically combined, or a display that may be used by dividing one screen. According to an embodiment of the present disclosure, the display unit 350 may display a result of the estimation of the SOC to the user through at least one display. Also, in other embodiments, the SOC estimation apparatus 105 may include more components than those shown in FIG. 3.

Figure 4:
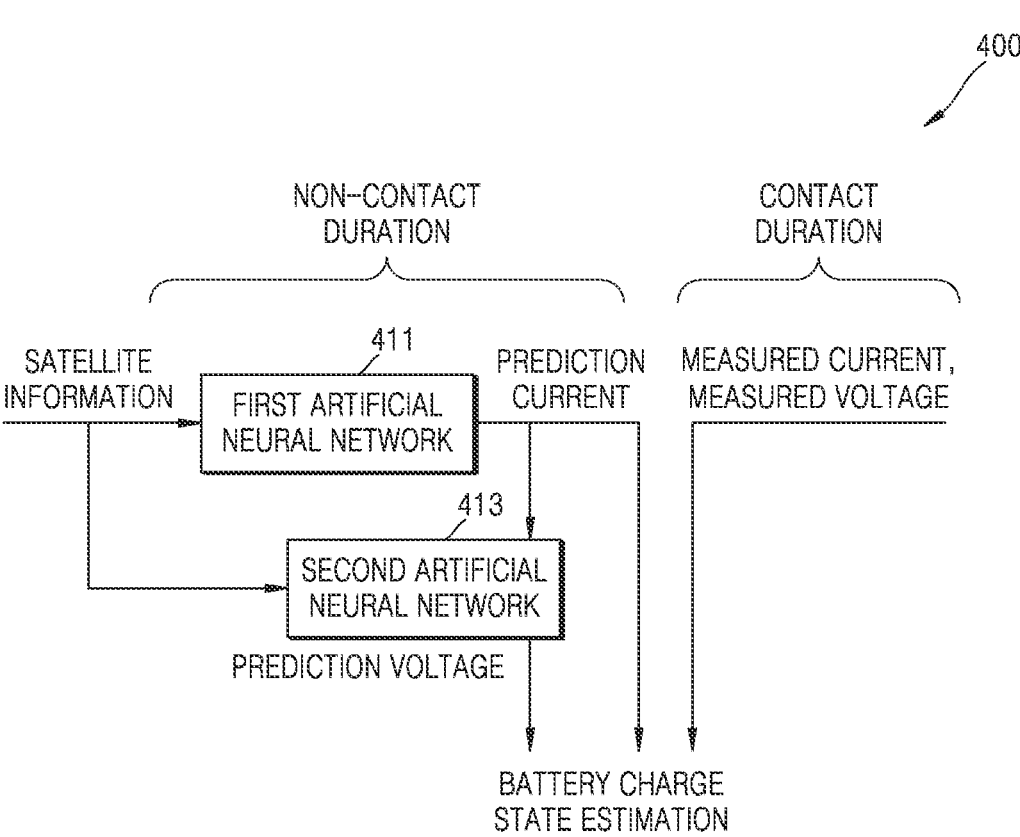
FIG. 4 is a schematic diagram illustrating a method of estimating a charge state of a battery from prediction information about a non-contact duration and measurement information about a contact duration of a satellite system, according to various embodiments of the present disclosure.

FIG. 4 is a schematic diagram 400 of a method of estimating a battery charge state from prediction information about a non-contact duration and measurement information about a contact duration in the satellite system 100 according to various embodiments of the present disclosure.

When the satellite 103 is disposed in the non-contact duration, the SOC estimation apparatus 105 may predict a current and voltage of the battery in the non-contact duration using a data-based learning model. Specifically, the SOC estimation apparatus 105 may acquire satellite information indicating the status of the satellite according to a mission plan of the satellite and generate prediction information about the battery state of the satellite in the non-contact duration from the satellite information based on a pre-learned artificial neural network. According to an embodiment of the present disclosure, the artificial neural network may include an artificial neural network configured with a bi-directional long short-term memory (BI-LSTM) network structure.

When the satellite 103 is disposed in the contact duration, the SOC estimation apparatus 105 may directly receive a current and voltage of the battery from the satellite. Specifically, the SOC estimation apparatus 105 may obtain measurement information about the battery state of the satellite in the contact duration of the satellite.

Thereafter, the SOC estimation apparatus 105 may estimate the SOC of the battery using prediction information on a current and voltage of the battery in the non-contact duration and measurement information on a voltage and current of the battery transmitted in real time in the contact duration. The SOC estimation apparatus 105 may continuously estimate the SOC of the battery using at least one of a Kalman filter, an extended Kalman filter (EKF), and an unscented Kalman filter (UKF).

Referring to FIG. 4, the SOC estimation apparatus 105 obtains satellite information indicating the status of a satellite according to a satellite mission plan in order to determine the state of a battery of the satellite in the non-contact duration. Thereafter, the SOC estimation apparatus 105 may receive satellite information and generate a prediction current based on a first artificial neural network 411 that is pre-learned. Thereafter, the SOC estimation apparatus 105 may receive satellite information and a prediction current and determine a prediction voltage based on a second artificial neural network 413 that is pre-learned. The first artificial neural network 411 may be a data-based learning execution model learned by setting training satellite information as input feature data and training prediction current as output feature data. The second artificial neural network 413 may be a data-based learning execution model learned by setting training satellite information and training prediction current as input data and setting a training prediction voltage as output data. The first artificial neural network 411 and the second artificial neural network 413 may continuously perform learning using input data and output data accumulated in the satellite.

The SOC estimation apparatus 105 may obtain measurement information about the state of the battery of the satellite from the satellite 103 in order to determine the state of the battery of the satellite in the contact duration. The SOC estimation apparatus 105 may directly receive the measured current and measured voltage of the battery from the satellite 103 when the satellite 103 is disposed in the contact duration. Thereafter, the SOC estimation apparatus 105 may estimate the SOC of the battery in the non-contact duration and the contact duration by synthesizing the prediction current, the prediction voltage, the measured current, and the measured voltage.

The first artificial neural network 411 may include a neural network pre-learned to receive training satellite information, and to output a training prediction current based on a first association parameter with respect to the degree of relationship between a satellite deployment state according to the training satellite information and a battery current according to the deployment state. The second artificial neural network 413 may include a neural network pre-learned to receive training satellite information and a training prediction current, and to output a training prediction voltage based on the degree of relationship between the satellite deployment state according to the satellite information, the training prediction current, and the battery voltage. Here, the satellite information may include at least one of a satellite attitude angle, a satellite position and velocity, a satellite attitude mode, an eclipse state of the satellite, a current time, and days after launch information.

The satellite attitude angle may include information on at least one of a roll angle, a pitch angle, and a yaw angle according to an attitude of the satellite driven. When the satellite attitude angle is changed, a direction of a solar panel of the satellite toward the sun may be changed, and a battery current and voltage charged from the battery plate may be different according to the satellite attitude angle.

The satellite position and velocity may include information about a current position of the satellite on the orbit of the satellite. Depending on the satellite position and velocity, a distance and direction between the satellite and the sun may change, and the battery current and voltage charged from the battery plate may vary depending on the position of the satellite.

A satellite attitude mode may include information about a current satellite attitude mode. The satellite may be operated according to a satellite attitude mode such as mission execution mode, sun gazing mode, and start mode, and a battery current and voltage charged from the solar panel may vary depending on the operation of the satellite.

The eclipse state of the satellite may include information on the deployment angle between the satellite, the sun, and the stars, the current time includes the date and time information that the satellite operates, and the days after launch information of the satellite may include the time since the launch. That is, the current and voltage of the battery charged from the solar panel may be different according to the eclipse state of the satellite, the current time, and the days after launch. In particular, the days after launch of the satellite may affect the battery current and voltage in relation to the aging of the satellite's battery over time.

Because the current and voltage of the battery of the satellite may be different depending on the satellite information, the first artificial neural network 411 may determine a prediction current according to the satellite information using the satellite information as a parameter, and the second artificial neural network 413 may determine a prediction voltage by using the prediction current in the satellite information. The SOC estimation apparatus 105 may determine the SOC of the battery using a prediction current and prediction voltage for the non-contact duration and a measured current and measured voltage for the contact duration.

FIG. 5 is a flowchart 500 illustrating an operating method of the SOC estimation apparatus 105 in the satellite system 100 according to various embodiments of the present disclosure. FIG. 5 illustrates a method of operating the SOC estimation apparatus 105 for estimating the SOC of a satellite battery using a processor 320 in a satellite system Referring to FIG. 5, in operation 501, the SOC estimation apparatus 105 obtains satellite information indicating the status of a satellite according to a satellite mission plan. The SOC estimation apparatus 105 may obtain satellite information in order to determine the state of a battery in a non-contact duration. According to an embodiment, the satellite information may include at least one of satellite attitude angle, a satellite position and velocity, a satellite attitude mode, an eclipse state of the satellite, a current time, and the days after launch.

In operation 502, the SOC estimation apparatus 105 generates prediction information about the battery state of the satellite in the non-contact duration of the satellite from the satellite information based on the pre-learned artificial neural network. The SOC estimation apparatus 105 may predict the battery state of the satellite for a non-contact duration using an artificial neural network.

According to an embodiment, the SOC estimation apparatus 105 may determine a prediction current of the battery in the non-contact duration of the satellite from the satellite information based on the first artificial neural network learned in advance and based on the pre-learned second artificial neural network, determine a prediction voltage of the battery in the non-contact duration from the satellite information and the prediction current in order to generate the prediction information.

According to an embodiment, the first artificial neural network may include a neural network pre-learned to receive training satellite information and output a training prediction current based on the degree of relationship between a satellite deployment according to the training satellite information and a battery current according to the deployment of the satellite.

According to an embodiment, the second artificial neural network may include a neural network pre-learned to receive training satellite information and training prediction current and to output a training prediction voltage based on the degree of relationship between a satellite deployment state according to the satellite information, a training prediction current, and a battery voltage.

According to an embodiment, the first artificial neural network and the second artificial neural network may have a BI-LSTM network structure.

In operation 503, the SOC estimation apparatus 105 obtains measurement information about the battery state of the satellite in the contact duration of the satellite. The SOC estimation apparatus 105 may directly receive measurement information about the battery state when the satellite is disposed in a contact duration.

In operation 504, the SOC estimation apparatus 105 estimates the SOC of the battery based on the prediction information and the measurement information. The SOC estimation apparatus 105 may determine the SOC of the battery by synthesizing the prediction information on the non-contact duration and the measurement information on the contact duration.

According to an embodiment, the SOC estimation apparatus 105 may determine the SOC of the battery using at least one of a Kalman filter, an EKF, and an UKF.

The methods according to the embodiments described in the claims or specification of the present disclosure may be implemented in the form of hardware, software, or a combination of hardware and software.

When the methods are implemented in the form of software, a computer readable storage medium storing one or more programs (software modules) may be provided. One or more programs stored in a computer-readable storage medium are configured for execution by one or more processors in an electronic apparatus. The one or more programs include instructions that cause the electronic apparatus to execute methods according to embodiments described in the claims or specification of the present disclosure.

The programs (software modules, software) may be stored in a random access memory, a non-volatile memory including flash memory, a read only memory (ROM), an electrically erasable programmable read only memory (EE-PROM), a magnetic disc storage device, a compact disc-ROM (CD-ROM), digital versatile discs (DVDs), or other types of optical storage devices, and magnetic cassettes. Alternatively, the programs may be stored in a memory configured of a combination of some or all of these storage devices. In addition, each configuration memory may include a plurality of memories.

In addition, the program may be stored in an accessible and attachable storage device through a communication network such as the internet, an intranet, a local area network (LAN), a wide area network (WAN), a storage area network (SAN), or a communication network consisting of a combination thereof. Such a storage device may be connected to an apparatus performing an embodiment of the present disclosure through an external port. In addition, a separate storage device on a communication network may be connected to an apparatus performing an embodiment of the present disclosure.

An apparatus and method according to various embodiments of the present disclosure may enable a satellite system to estimate the SOC of a battery of a satellite.

Also, the apparatus and method according to various embodiments of the present disclosure may predict a battery state of a satellite in a non-contact duration of the satellite by using an artificial neural network.

Also, the apparatus and method according to various embodiments of the present disclosure may determine the SOC of a battery by using measurement information about a battery state in a contact duration and prediction information about a battery state in a non-contact duration.

In addition, the apparatus and method according to various embodiments of the present disclosure may allow simple and precise determination of the SOC of the battery by using measurement information and prediction information.

Advantages obtainable in the present disclosure are not limited to the advantages mentioned above, and other advantages not mentioned may be clearly understood by those skilled in the art from the description above.

In the specific embodiments of the present disclosure described above, components included in the disclosure are expressed in singular or plural numbers according to the specific embodiments presented. However, the singular or plural expressions are selected appropriately for the presented situation for convenience of explanation, and the present disclosure is not limited to singular or plural components, and even components expressed in the plural number may be configured of a singular number, or even components expressed in the singular number may be configured of a plurality.

In the detailed description of the present disclosure, specific embodiments have been described, but various modifications are possible without departing from the scope of the present disclosure. Therefore, the scope of the present disclosure should not be limited to and defined by the embodiments described above but should be defined by not only the scope of the claims to be described later, but also those equivalent to the scope of these claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An operating method of an apparatus for estimating a state of charge of a satellite battery in a satellite system, the operating method comprising:

obtaining satellite information indicating a status of a satellite according to a mission plan of the satellite;

generating prediction information about a battery state of the satellite in a non-contact duration of the satellite by:

determining a prediction current of the battery in a non-contact duration of the satellite from the satellite information based on a first artificial neural network that is pre-learned to receive training satellite information and to output a training prediction current based on a degree of relationship between a satellite deployment state according to the training satellite information and a current of the battery according to the deployment state, and determining a prediction voltage of the battery in the non-contact duration from the satellite information and the prediction current based on a second artificial neural network that is pre-learned to receive the training satellite information and the training prediction current, and to output a training prediction voltage based on a degree of relationship between the satellite deployment state according to the satellite information, the training prediction current, and the battery voltage;

obtaining measurement information about a battery state of the satellite in a contact duration of the satellite; and estimating the state of charge of the battery based on the prediction information and the measurement information.

2. The operating method of claim 1, wherein the estimating of the state of charge of the battery includes determining the state of charge of the battery using at least one of a Kalman filter, an extended Kalman filter (EKF), and an unscented Kalman filter (UKF).

3. The operating method of claim 1, wherein the satellite information includes at least one of a satellite attitude angle, a satellite position, a satellite attitude mode, an eclipse state of the satellite, a current time, and days after launch.

4. The operating method of claim 1, wherein the first artificial neural network and the second artificial neural network are each configured based on a bi-directional long short-term memory (BI-LSTM) network structure.

5. An apparatus for estimating a state of charge of a satellite battery in a satellite system, the apparatus comprising a processor, wherein the processor is configured to acquire satellite information indicating a status of the satellite according to a mission plan of a satellite;

generate prediction information about a battery state of the satellite in a non-contact duration of the satellite by:

determining a prediction current of the battery in the non-contact duration from the satellite information based on a first artificial neural network, that is pre-learned to receive training satellite information and to output a training prediction current based on a degree of relationship between a satellite deployment state according to the training satellite information and a current of the battery according to the deployment state, and determining a prediction voltage of the battery in the non-contact duration from the satellite information and the prediction current based on a second artificial neural network that is pre-learned to receive training satellite information and a training prediction current and to output a training prediction voltage based on a degree of relationship between the satellite deployment state according to the satellite information, the training prediction current, and the battery voltage;

obtain measurement information about the battery state of the satellite in a contact duration of the satellite; and estimate the state of charge of the satellite battery based on the prediction information and the measurement information.

6. The apparatus of claim 5, wherein the processor is further configured to determine the state of charge of the battery using at least one of a Kalman filter, an EKF, and an UKF.

7. The apparatus of claim 5, wherein the satellite information includes at least one of a satellite attitude angle, a satellite position, a satellite attitude mode, an eclipse state of the satellite, a current time, and days after launch information.

8. The apparatus of claim 5, wherein the first artificial neural network and the second artificial neural network are each configured based on a bi-directional long short-term memory (BI-LSTM) network structure.

9. An operating method of an apparatus for estimating a state of charge of a satellite battery in a satellite system, the operating method comprising:

obtaining satellite information indicating a status of a satellite according to a mission plan of the satellite;

generating prediction information about a battery state of the satellite in a non-contact duration of the satellite by determining a prediction current of the battery in a non-contact duration of the satellite from the satellite information based on a first artificial neural network that is pre-learned to receive training satellite information and to output a training prediction current based on a degree of relationship between a satellite deployment state according to the training satellite information and a current of the battery according to the deployment state;

obtaining measurement information about a battery state of the satellite in a contact duration of the satellite; and estimating the state of charge of the battery based on the prediction information and the measurement information.

\* \* \* \* \*